United States Patent
Shabtay et al.

(10) Patent No.: US 7,197,008 B1
(45) Date of Patent: Mar. 27, 2007

(54) END-TO-END NOTIFICATION OF LOCAL PROTECTION USING OAM PROTOCOL

(75) Inventors: Lior Shabtay, Ganai Tikva (IL); Yaron Raz, Emek Sorek (IL); Yoav Kluger, Zichron Yakov (IL)

(73) Assignee: Atrica Israel Ltd., Herzelia (IL)

( * ) Notice: Subject to any disclaimer, the term of this patent is extended or adjusted under 35 U.S.C. 154(b) by 1061 days.

(21) Appl. No.: 10/190,236

(22) Filed: Jul. 5, 2002

(51) Int. Cl.
- H04L 12/26 (2006.01)
- H04L 12/56 (2006.01)
- G06F 15/16 (2006.01)
- G06F 15/173 (2006.01)

(52) U.S. Cl. ............... 370/218; 370/231; 370/236.2; 370/241.1; 370/244; 370/248; 370/396; 709/223; 709/238

(58) Field of Classification Search ......... 370/218, 370/231, 236.2, 241.1, 244, 248, 396; 709/223, 709/238
See application file for complete search history.

(56) References Cited

U.S. PATENT DOCUMENTS

| | | | |
|---|---|---|---|
| 5,712,853 A * | 1/1998 | Mathur et al. ............ 370/467 |
| 5,818,842 A * | 10/1998 | Burwell et al. ........... 370/397 |
| 5,838,924 A | 11/1998 | Anderson et al. |
| 6,122,759 A | 9/2000 | Ayanoglu et al. |
| 6,247,051 B1 | 6/2001 | Shimada |
| 6,301,254 B1 | 10/2001 | Chan et al. |
| 6,411,600 B1 * | 6/2002 | Kwak et al. ............. 370/225 |
| 6,442,131 B1 * | 8/2002 | Kondo .................... 370/218 |
| 6,553,015 B1 * | 4/2003 | Sato ....................... 370/331 |
| 6,654,923 B1 * | 11/2003 | Grenier et al. ............ 714/752 |
| 6,754,743 B2 * | 6/2004 | Maessen .................... 710/56 |
| 6,895,441 B1 * | 5/2005 | Shabtay et al. .......... 709/238 |
| 6,898,177 B1 * | 5/2005 | Grenier et al. ............ 370/225 |
| 7,043,541 B1 * | 5/2006 | Bechtolsheim et al. ..... 709/223 |
| 2003/0112760 A1 * | 6/2003 | Puppa et al. ............. 370/241.1 |
| 2004/0213256 A1 * | 10/2004 | Muys et al. ............. 370/395.1 |

OTHER PUBLICATIONS

Marty Borden et al., "A Framework for Metro Ethernet Protection", Metro Ethernet Forum Technical Committee, Oct. 2002, pp. 1-21.
Ping Pan et al., "Fast Reoute Extensions to RSVP-TE for LSP Tunnels", draft-ietf-mpls-rsvp-lsp-fastreoute-00.txt, Internet Engineering Task Force, Network Working Group, Jul. 2002, pp. 1-33.

* cited by examiner

Primary Examiner—Alpus H. Hsu
(74) Attorney, Agent, or Firm—Zaretsky & Associates PC; Howard Zaretsky

(57) ABSTRACT

An end-to-end monitoring mechanism whereby edge nodes are notified that a particular path flows through a local protection tunnel along the way. The notification mechanism utilizes OAM packets which include a link protection indication that are transmitted on the Ethernet service layer. The link protection indication may be represented by one or more flags to indicate that local protection is in place along the path. The mechanism enables fast local protection to be used with slower end-to-end protection by informing the latter when local protection is activated. In an implementation in which local-protection does not preserve the CIR of the protected traffic, the invention provides minimal interruption of Committed Information Rate (CIR) connections by minimizing the time traffic is diverted through local protection tunnels. Notification of the edge node that local protection is in use occurs very quickly, thus allowing the edge node to rapidly switch to a backup path.

43 Claims, 8 Drawing Sheets

END-TO-END NOTIFICATION OF LOCAL PROTECTION USING OAM PROTOCOL

FIELD OF THE INVENTION

The present invention relates generally to data communications and more particularly relates to path protection and local-protection mechanisms in networks utilizing path oriented forwarding.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

Multiprotocol Label Switching (MPLS) based networks are becoming increasingly popular especially in traffic engineering IP networks. MPLS uses a label switching model to switch data over a Label Switched Path (LSP). The route of an LSP is determined by the network layer routing function or by a centralized entity (e.g., a Network Management System) from the topology of the network, the status of its resources and the demands of the user. Any suitable link state routing protocol may be used such as Open Shortest Path First (OSPF) or Intermediate System to Intermediate System (ISIS) routing protocol to provide the link state topology information needed by the network layer routing to engineer data traffic. Another possibility is to utilize a local neighbor-discovery protocol whereby the global topology is maintained by a centralized management entity. LSPs may be set up using any suitable signaling protocol such as RSVP-TE, CR-LDP or using the management plane (e.g., the NMS setting the relevant MIB items that create the LSPs).

There is increasing demand by users that networks include a mechanism for fast repair of failed links or nodes. Since a LSP traverses a fixed path in the network, its reliability is dependent on the links and nodes along the path. It is common for many networks to provide some form of protection in the event of failure. For example, in the event of a link or node failure, the network can be adapted to switch data traffic around the failed element via a protection route.

The protection of traffic can be accomplished in several ways using the MPLS framework. Two ways that traffic can be protected using MPLS include recovery via LSP rerouting or via MPLS protection switching or rerouting actions.

The two basic models for path recovery include path rerouting and protection switching. Protection switching and rerouting may be used in combination. For example, protection switching provides a quick switchover to a recovery path for rapid restoration of connectivity while slower path rerouting determines a new optimal network configuration at a later time.

In recovery by path rerouting, new paths or path segments are established on demand for restoring traffic after the occurrence of a fault. The new paths may be chosen based upon fault information, network routing policies, pre-defined configurations and network topology information. Thus, upon detecting a fault, paths or path segments to bypass the fault are established using the signaling protocol. Note that reroute mechanisms are inherently slower than protection switching mechanisms, since more processing and configuring must be done following the detection of a fault. The advantage of reroute mechanisms is that they are cheaper since no resources are committed until after the fault occurs and the location of the fault is detected. An additional advantage of reroute mechanisms is that the LSP paths they create are better optimized, and therefore consume less network resources.

Note also that once the network routing algorithms have converged after a fault, it may be preferable, to re-optimize the network by performing a reroute based on the current state of the network and network policies in place.

In contrast to path rerouting, protection switching recovery mechanisms pre-establish a recovery path or path segment, based on network routing policies and the restoration requirements of the traffic on the working path. Preferably, the recovery path is link and node disjoint with the working path. When a fault is detected, the protected traffic is switched over to the recovery path(s) and restored.

The resources (i.e. bandwidth, buffers, processing, etc.) on the recovery path may be used to carry either a copy of the working path traffic or extra traffic that is displaced when a protection switch occurs leading to two subtypes of protection switching. In the first, known as 1+1 protection, the resources (bandwidth, buffers, processing capacity) on the recovery path are fully reserved, and carry the same traffic as the working path. Selection between the traffic on the working and recovery paths is made at the path merge LSR (PML).

In the second, known as 1:1 protection, the resources (if any) allocated on the recovery path are fully available to low priority or excess information rate (EIR) traffic except when the recovery path is in use due to a fault on the working path. In other words, in 1:1 protection, the protected traffic normally travels only on the working path, and is switched to the recovery path only when the working path has a fault. Once the protection switch is initiated, the low priority or EIR traffic being carried on the recovery path is displaced by the protected traffic. This method affords a way to make efficient use of the recovery path resources.

An example of protection switching in MPLS networks is described below. Consider an example MPLS based network incorporating a bypass tunnel. The network comprises a plurality of label switched routers (LSRs) connected by links. Backup tunnels are established for protecting LSPs statically by the management station or using RSVP signaling. RSVP extensions for setting up protection tunnels have been defined. To meet the needs of real-time applications such as video on demand, voice over IP, etc., it is desirable to affect the repair of LSPs within tens of milliseconds. Protection switching can provide such repair times.

The LSPs can also be protected (i.e. backed up) using the label stacking capabilities of MPLS. Instead of creating a separate LSP for every backed-up LSP, a single LSP is created which serves to backup a set of tunnels. Such a tunnel is termed a bypass tunnel. The bypass tunnel itself is established just like any other LSP-based tunnel. The bypass tunnel must intersect the original tunnel(s) somewhere downstream of the point of local repair. Note that this implies that the set of tunnels being backed up all pass through a common downstream node. Candidates for this set of tunnels include all tunnels that pass through the point of local repair and through this common node which do not use the facilities being bypassed.

To repair the backed up tunnels, packets belonging to a failed tunnel are redirected onto the bypass tunnel. An additional label representing the bypass tunnel is stacked onto the redirected packets. At the last LSR of the bypass tunnel, the label for the bypass tunnel is popped off the stack, revealing the label that represents the tunnel being backed up. An alternative approach is to pop the bypass-tunnel label at the penultimate LSR of the bypass tunnel.

As described above, two types of protection include end-to-end protection and local protection. The former provides an alternative backup path in the event a failure occurs along the primary path. The latter provides protection at the core wherein each link is protected by a backup protection tunnel. In the event of a link failure, local protection quickly restores traffic through the bypass protection tunnel. No efficient mechanism exists, however, to inform the edge devices that a bypass protection tunnel is in use. This is important since the edge nodes are the only nodes that implement end-to-end protection for a path. Once notified, the edge nodes may divert traffic to a backup path. In addition, such a mechanism enables the end-nodes of a tunneling-service to report the fact that the service goes through a protection tunnel.

There is thus a need for a notification mechanism capable of informing the edge nodes on the ends of a path that local protection has been deployed somewhere along the path. The notification mechanism should be scaleable and simple to implement without demanding large computing resources from intermediate nodes.

SUMMARY OF THE INVENTION

The present invention provides a notification mechanism whereby edge nodes are informed of the use of local protection tunnels along a path. The notification mechanism utilizes operation, administration and maintenance (OAM) packets to carry one or more flags to indicate that local protection is in place along the path. End-to-end protection is typically slow (e.g., less than 10 seconds) while local protection is fast (e.g., sub 50 milliseconds). The mechanism thus enables the interaction between slow end-to-end protection and fast core local protection.

In a bandwidth allocation scheme in which bandwidth is not allocated to local-protection tunnels, the invention provides minimal interruption of Committed Information Rate (CIR) connections by minimizing the time traffic is diverted through local protection tunnels. Notification of the edge node that local protection is in use occurs very quickly, thus allowing the edge node to rapidly switch to an alternative path. The speed at which the notification occurs depends on the frequency OAM packets are sent on a connection. Assuming OAM packets are sent once per second, traffic can be switched to the backup path within a second (or two seconds if the two directions of the main tunnel of the connection do not follow the same path) thus reducing performance for CIR traffic for no more than one or two seconds.

A goal of the present invention is to provide a mechanism that provides both end-to-end protection and local protection for traffic that does not impose a CIR bandwidth budget penalty for both. Typically, providing both local and end-to-end protection would require doubling the bandwidth for both. In most cases, customers are not willing to pay for four times the bandwidth they need but they do expect to pay for one protection bandwidth budget penalty (i.e. one for main path and one for the backup path). In the embodiment described herein, customers pay a 50% penalty for end-to-end protection. The tradeoff of this is that low priority traffic suffers when local protection is activated. Thus, the performance of local links degrade for short periods of time (e.g., 2 seconds) but only for low priority traffic. High priority traffic seizes the bandwidth and low priority gets displaced. For this reason, high priority traffic is limited to 40% of the link.

It is important to point out that interaction of local-protection and end-to-end protection in accordance with the invention is relevant even if no explicit bandwidth allocations are performed and even if no link state advertising is performed (in which case provisioning is most likely performed by a centralized entity).

It is important to also note that the invention is not limited by the type of network in use, the PHY layer, the type of protection paths used or by the type of signaling in use or by whether provisioning is based on signaling or performed in the management plane. Examples of applicable networks include, but are not limited to, Ethernet, MPLS and Private Network to Network Interface (PNNI) based Asynchronous Transfer Mode (ATM) networks.

Note that the invention is suited for implementation in hardware such as a network processor (which may comprise a network-processor chip, an FPGA, an ASIC, etc.), adapted to implement the mechanism of the present invention, software or a combination of hardware and software. In one embodiment, a network device comprising a processor, memory, etc. is operative to execute software adapted to perform the notification mechanism of the present invention.

There is thus provided in accordance with the present invention a method of end-to-end notification of local protection in a network for use on an intermediate node along a path in the network, the method comprising the steps of receiving end-to-end protocol packets sent from a first edge node to a second edge-node, identifying received end-to-end protocol packets forwarded to a local protection tunnel due to a failure in the network and setting a link protection indication in end-to-end protocol packets to be sent over the local protection tunnel.

There is also provided in accordance with the present invention a method of monitoring the availability of a path in a network, the method comprising the steps of generating and sending operation, administration and maintenance (OAM) packets end-to-end on a path in the network, receiving OAM packets on an intermediate node and identifying received OAM packets directed to a protection path and setting a link protection flag in the identified OAM packets in response thereto.

There is further provided in accordance with the present invention a method of end-to-end notification of local protection in a network for use in a first edge node in communication with a second edge node along a path in the network, the method comprising the steps of receiving operation, administration and maintenance (OAM) packets comprising a link protection bit set by an intermediate node in the event the OAM packet is directed through a local protection tunnel due to a failure in the network, identifying received OAM packets having the link protection bit set indicating that the path has been routed through a local protection tunnel and redirecting traffic destined to the second edge node over a backup path in response to the link protection bit being set.

There is also provided in accordance with the present invention a network processor for use in an intermediate network node located along a path in a network comprising means for receiving end-to-end protocol packets sent from an edge node, the end-to-end protocol packets comprising a link protection flag therein, means for identifying received end-to-end protocol packets destined to a local protection tunnel due to a failure in the network and means for setting the link protection flag in end-to-end protocol packets to be sent over the local protection tunnel.

There is further provided in accordance with the present invention a network device for use in an intermediate network node located along a path in a network comprising one or more line PHY line interfaces for interfacing the network device to one or more communication links, a switch adapted to switch data between a plurality of ingress inputs and a plurality of egress outputs, processing means operative to receive operation, administration and maintenance (OAM) packets sent from an edge node, the OAM packets comprising a link protection indication therein, identify received OAM packets destined to a local protection tunnel due to a failure in the network and set the link protection indication in OAM packets to be sent over the local protection tunnel.

There is also provided in accordance with the present invention a network device for use in a first edge node in communication with a second edge node along a path in the network comprising one or more PHY line interfaces for interfacing the network device to one or more communication links, a switch adapted to switch data between a plurality of ingress inputs and a plurality of egress outputs, processing means operative to receive operation, administration and maintenance (OAM) packets comprising a link protection indication set by an intermediate node in the event the OAM packet is directed through a local protection tunnel due to a failure in the network, identify received OAM packets having the link protection indication set indicating that the path has been routed through a local protection tunnel and redirect traffic destined to the second edge node over a backup path in response to the link protection indication being set.

There is further provided in accordance with the present invention a computer program product for use in a network device, the computer program product comprising a computer useable medium having computer readable program code means embodied in the medium for performing a path reroute in a network, the computer program product comprising computer readable program code means for receiving operation, administration and maintenance (OAM) packets sent from an edge node, the OAM packets comprising a link protection flag therein, computer readable program code means for identifying received OAM packets destined to a local protection tunnel due to a failure in the network and computer readable program code means for setting the link protection flag in OAM packets to be sent over the local protection tunnel.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
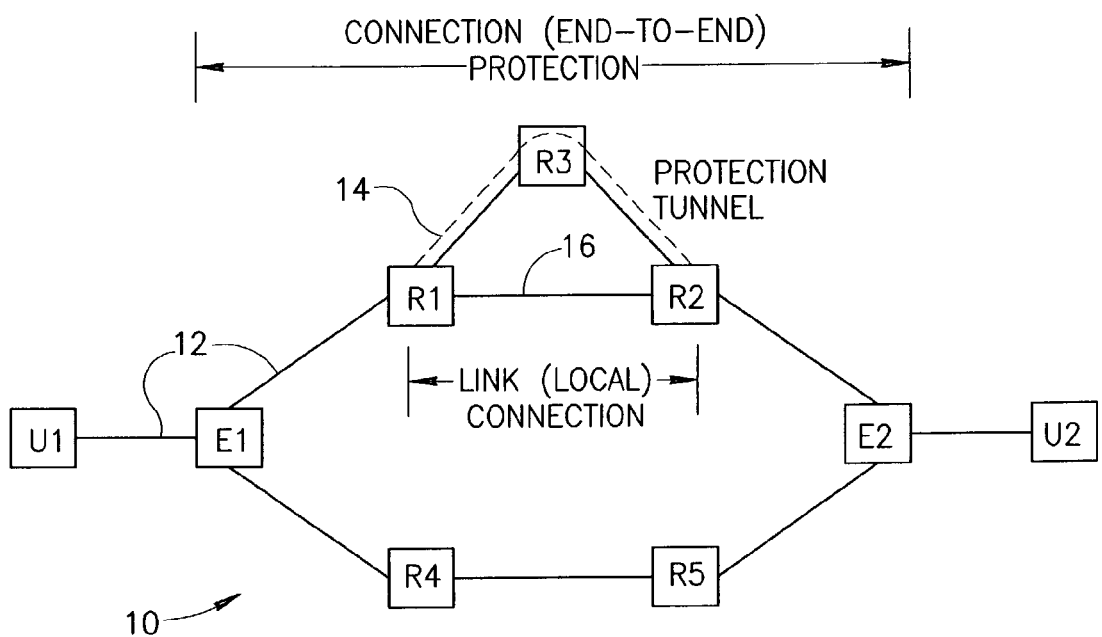
FIG. 1 is a diagram illustrating an example MPLS based network having local protection as well as end-to-end protection.

The following notation is used throughout this document.

| Term | Definition |
| --- | --- |
| ASIC | Application Specific Integrated Circuit |
| ATM | Asynchronous Transfer Mode |
| CAC | Call Admission Control |
| CD-ROM | Compact Disc-Read Only Memory |
| CIR | Committed Information Rate |
| CPU | Central Processing Unit |
| CR-LDP | Constraint-based Label Distribution Protocol |
| DAT | Digital Audio Tape |
| DSP | Digital Signal Processor |
| DVD | Digital Versatile Disk |
| EEPROM | Electrically Erasable Programmable Read Only Memory |
| EIR | Excess Information Rate |
| EPROM | Erasable Programmable Read Only Memory |
| FDDI | Fiber Distributed Data Interface |
| FIS | Failure Indication Signal |
| FPGA | Field Programmable Gate Array |
| FRS | Fault Recovery Signal |
| IP | Internet Protocol |
| ISIS | Intermediate System to Intermediate System |
| LAN | Local Area Network |
| LD | Link Degraded |
| LDP | Label Distribution Protocol |
| LF | Link Failure |
| LSP | Label Switched Path |
| LSR | Label Switching Router |
| MPLS | Multi-Protocol Label Switching |
| NIC | Network Interface Card |
| NMS | Network Management System |
| OAM | Operation, Administration and Maintenance |
| OSPF | Open Shortest Path First |
| OSPF-TE | Open Shortest Path First with Traffic Engineering |
| PF | Path Failure |
| PG | Path Group |
| PML | Path Merge LSR |
| PNNI | Private Network to Network Interface |
| PSL | Path Switch LSR |
| PVC | Permanent Virtual Circuit |
| RAM | Random Access Memory |
| ROM | Read Only Memory |
| RSVP | Reservation Protocol |
| RSVP-TE | Reservation Protocol with Traffic Engineering extensions |
| SDH | Synchronous Data Hierarchy |
| SONET | Synchronous Optical Network |
| WDM | Wavelength Division Multiplexing |

Definitions Used Throughout

The following terms and definitions apply throughout this document.

Rerouting is defined as a procedure for changing the route of a traffic path. Rerouting can serve as a recovery mechanism in which the broken path, the recovery path or segments of these paths are created dynamically after the detection of a fault on the working path. In other words, rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is pre-established.

Protection bandwidth is defined as bandwidth on a link reserved for protection purposes, e.g., protection tunnels, bypass tunnels, recovery path, detour paths and protection paths.

The working path is the protected path that carries traffic before the occurrence of a fault. The working path exists, in MPLS networks for example, between a PSL and PML. The working path can be of different kinds; a hop-by-hop routed path, a trunk, a link, an LSP, part of an LSP, a group of LSP parts or part of a multipoint-to-point LSP. The term primary path is interchangeable with the term working path. The active path is the path that is currently active, which may comprise the working (i.e. primary) path or the recovery (i.e. alternative or protection) path.

The recovery path is the path by which traffic is restored after the occurrence of a fault. In other words, the path on which the traffic is directed by the recovery mechanism. The recovery path may be established by MPLS means. The terms backup path, alternative path and protection path are synonymous with the term recovery path.

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

Revertive mode refers to a recovery mode in which traffic is automatically switched back from the recovery path to the original working path upon the restoration of the working path to a fault-free condition. This assumes a failed working path does not automatically surrender resources to the network. Non-revertive mode refers to a recovery mode in which traffic is not automatically switched back to the original working path after this path is restored to a fault-condition. Note that depending on the configuration, the original working path may, upon moving to a fault-free condition, become the recovery path, or it may be used for new working traffic, and be no longer associated with its original recovery path.

MPLS protection domain refers to the set of LSRs over which a working path and its corresponding recovery path are routed. MPLS protection plan refers to the set of all LSP protection paths and the mapping from working to protection paths deployed in an MPLS protection domain at a given time.

The term MPLS-based recovery refers to the ability to quickly and completely restore traffic lost due to a fault in an MPLS-network. The fault may be detected on the MPLS layer or in lower layers over which MPLS traffic is transported. The fastest MPLS recovery is typically achieved using protection switching. The MPLS LSR switchover time is comparable to the 50 ms switchover time of SONET.

DETAILED DESCRIPTION OF THE INVENTION

The present invention provides a notification mechanism whereby edge nodes are informed of the use of local protection (or bypass) tunnels along a path. The notification mechanism utilizes operation, administration and maintenance (OAM) packets to carry one or more flags to indicate that local protection is in place along the path. End-to-end protection is typically slow (e.g., less than 10 seconds) while local protection is fast (e.g., sub 50 milliseconds). The mechanism thus enables the interaction between slow end-to-end protection and fast core local protection.

For illustration purposes, the principles of the present invention are described in the context of an MPLS based network employing any suitable routing such as OSPF-TE and either signaling such as RSVP-TE signaling or management-plane based provisioning such as creation of PVCs using an NMS. Further, it is intended that the mechanism of the present invention be implemented in network devices such as routers (e.g., LSRs in MPLS networks) making up the nodes in a network and include edge nodes and intermediate nodes. It is not intended, however, that the invention be limited to the configurations and embodiments described herein. It is appreciated that one skilled in the networking, electrical and/or software arts may apply the principles of the present invention to numerous other types of networking devices and network configurations as well without departing from the spirit and scope of the invention.

In accordance with the invention, network protection is built from two main elements including (1) end-to-end protection and (2) core local protection. In end-to-end protection each connection/tunnel is allocated with two disjoined LSPs (or two disjoined pairs of LSPs, each containing two LSPs using the same path in reverse directions). These LSPs can be provisioned as PVC-based static paths or signaled as SVCs/SPVCs. The edge device at each end of a connection/tunnel selects which of the two paths to use by conducting an end-to-end OAM protocol (or 'hello' protocol) with the edge device at the other end of the connection/tunnel. In core local protection each link is protected by a protection (or bypass) tunnel or backup tunnel.

Use of a combination of these two protection schemes provides fast (sub 50 milliseconds) core local protection as well as protection from a single fault of any other kind (e.g., node, card, network-edge link failure, etc., if not covered by a specific implementation of local-protection) in sub 10 seconds.

A diagram illustrating an example MPLS based network having local protection as well as end-to-end protection is shown in FIG. 1. The network, generally referenced 10, comprises two users U1 and U2, two edge nodes E1 and E2 and a plurality of intermediate nodes R1, R2, R3, R4, R5 all connected by links 12. End-to-end protection is provided between edge nodes E1 and E2 as indicated. In addition, local protection against link failures is provided between intermediate nodes. Each link has associated with it a protection tunnel, which is used in the event the link fails. For example, protection tunnel 14 passing through R3

(indicated by the dashed line) serves as a backup in the event link 16 fails. In principle, protection tunnels can also be created to provide protection from node failures.

Figure 2:
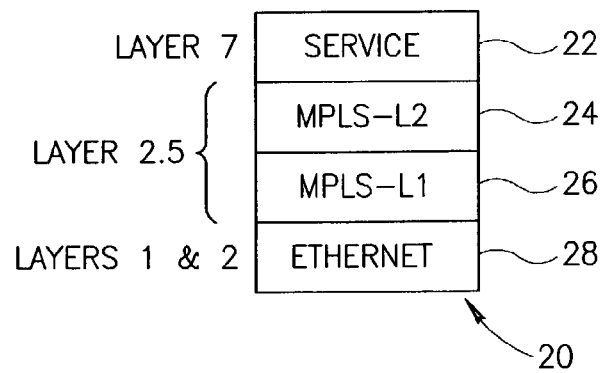
FIG. 2 is a diagram illustrating the communication stack layers implemented in the MPLS nodes of a network.

A diagram illustrating the communication stack layers implemented in the MPLS nodes of the network is shown in FIG. 2. The communication stack 20 implemented in each node that runs the MPLS protocol comprises an Ethernet layer 28 at the base performing layer 1 and 2 functions. The MPLS layers 1 and 2 26, 28 are positioned at layer 2.5 and function to implement MPLS protocol functionality. The service layer 22, equivalent to layer 7, runs over the MPLS layer. The service layer can be emulated-Ethernet, other emulated layer-2 protocols, tunneled-IP, etc.

Figure 3:
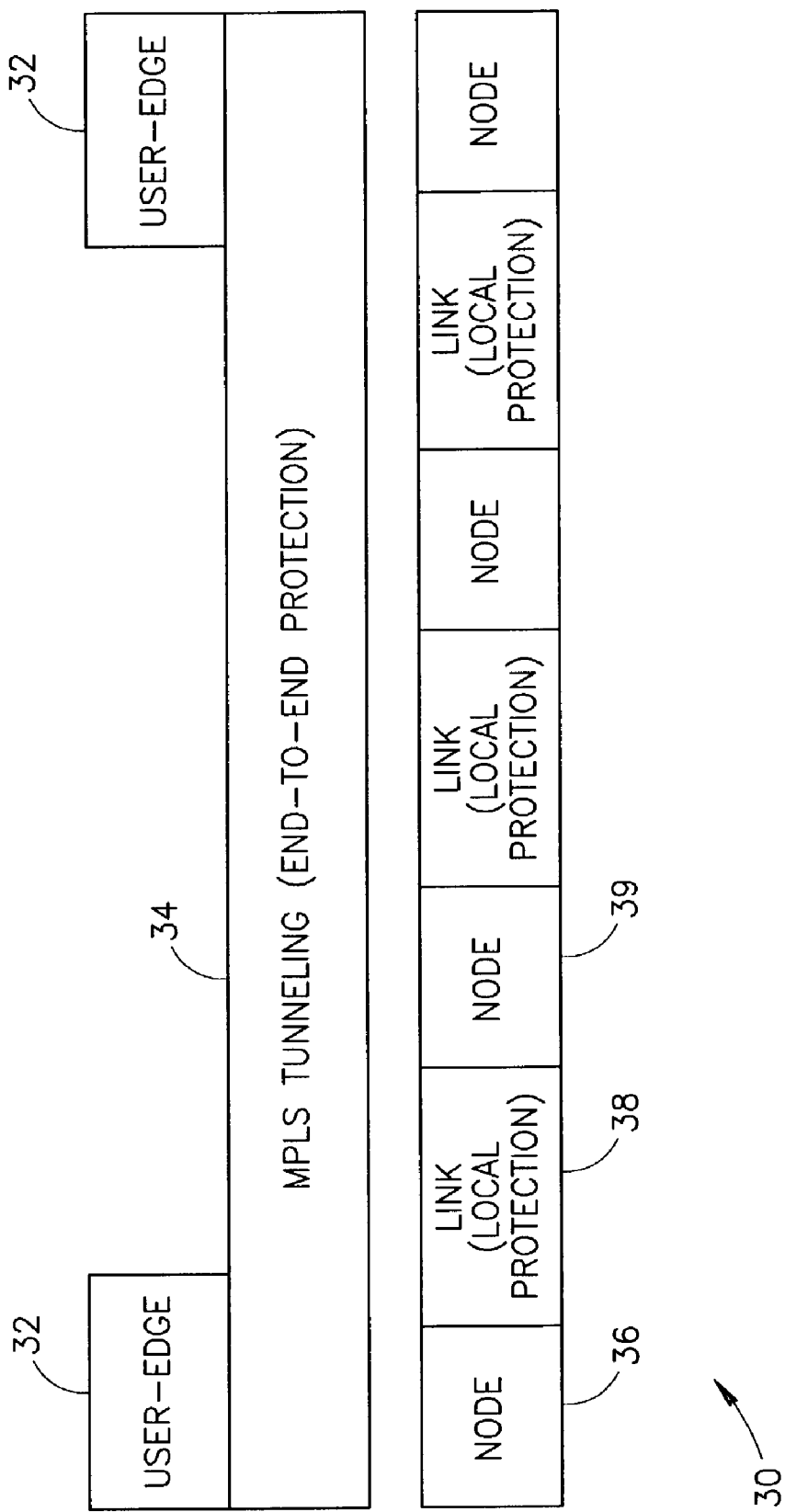
FIG. 3 is a model illustrating showing the end-to-end protection being performed at a layer above the core local protection layer in accordance with the present invention.

In accordance with the invention, the end-to-end protection is performed at a layer situated above the layer of the core local protection. The end-to-end protection is performed at the end-to-end connection/tunnel layer or service layer 22 (FIG. 2), and the core local protection is performed at the MPLS layer on a per link basis. In principle, local protection-tunnels can also be set for protecting nodes and other network resources. A single point-to-point connection/ tunnel spans a number of links wherein each can be protected by the local protection mechanism. A model showing the end-to-end protection being performed at a layer above the core local protection layer in accordance with the present invention is shown in FIG. 3. The model, generally referenced 30, comprises the user-edge layer 32 at the top with the MPLS-tunneling layer 34 for performing end-to-end protection immediately below. Note that the connection protection spans many nodes and links. Local protection is provided for each link 38 connecting the intermediate nodes 36.

In accordance with the invention, the local protection mechanism is operative to provide protection on a link basis rather than a path basis. Note that the mechanism is also capable of providing node-protection. It may be that only a portion of the traffic that flows on a link will use the protection MPLS-tunnel protecting this link. Local protection uses the well known MPLS multi-layered stack in order to aggregate several connections/tunnels inside an 'LSP-based MPLS tunnel' over the new path.

In order to provide protection for a specific link, an MPLS tunnel (built of an LSP) is set up. This MPLS tunnel is actually another LSP from the upstream node to the downstream node that does not go through the link itself. When an upstream node detects that the link has failed, it forwards all the protected traffic destined to that link to the protection MPLS tunnel. Instead of replacing each LSP label with the label of the protection tunnel, however, the protection tunnel label is pushed in addition to the original swapped label. When the traffic reaches the other end of the MPLS tunnel, the MPLS tunnel label is popped and the inner label is used to forward the data further on. This enables one MPLS tunnel to be used for several LSPs while still permitting them to be differentiated behind the MPLS tunnel.

In accordance with the invention, the network is adapted to notify the nodes on either end of a path that the path goes through local protection due to a failure in the network. The notification is achieved using availability-monitoring protocol packets that pass through the local protection tunnel. The availability-monitoring protocol packet may also comprise Hello protocol packets or OAM packets depending on the implementation of the invention. The availability packets (or messages) are marked using one or more flags by the network processor that forwards them to the protection tunnel. Note that the network processor refers to the hardware portion of the port performing the protection, but may comprise hardware, software or a combination of the two.

The arrival of marked availability-monitoring protocol messages at the user edge node at the other end of the path is used to indicate to the user edge node that the path goes through a local-protection tunnel. The arrival of the marked messages can be used for any purpose such as activating end-to-end protection, alerting the operator about the fact that the path goes through a local-protection tunnel, etc.

Figure 4:
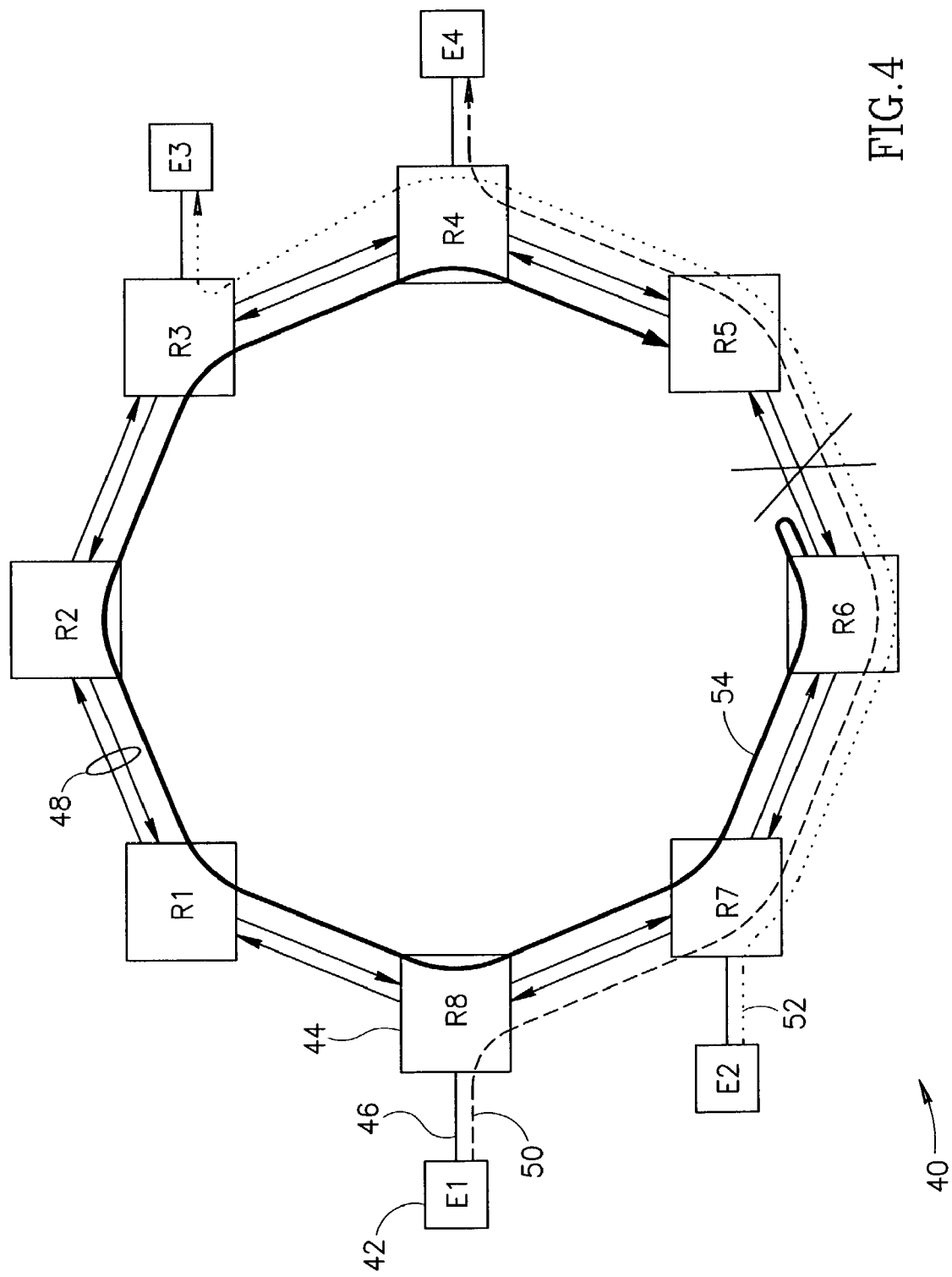
FIG. 4 is a diagram illustrating the application of the notification mechanism of the present invention to a ring type network.

Note that the invention is not limited to any particular type or configuration of network. The invention may be applied to any network that utilizes core local protection in conjunction with an end-to-end protocol between the edge-nodes along the forwarding path. Note that the invention is not limited to a specific topology of the network. As an example, consider the application of the notification mechanism of the present invention to a ring topology network as shown in FIG. 4. The ring network, generally referenced 40, comprises several edge devices 42, labeled E1, E2, E3, E4 and a plurality of nodes 44, labeled R1 through R8, situated around the ring connected to each other via bi-directional links 48 and to edge nodes via links 46.

The ring network provides protection for the failure of the link both for LSP 50 (indicated by the dashed line) and for LSP 52 (indicated by the dotted line) via protection tunnel 54 (indicated by thick line). Note that only a single tunnel is required per link in each direction. Packets in different priorities use the same tunnel and are handled differently according to their explicit priority field.

Note that the end-to-end protection scheme is needed in order to overcome failures in the network in a way that keeps the service active even after a failure that is not protected by the local-protection mechanism or for which the local-protection mechanism does not provide the same amount of CIR bandwidth. This is achieved by creating two paths for each protected point-to-point connection. At any given time, however, only one is used wherein the other serves as a protection path to be used in case of a failure.

In accordance with the invention, the notification of a path failure is performed by an availability-monitoring protocol (OAM or Hello protocol) that is executed by the network devices at both ends of the path. The OAM protocol comprises sending OAM packets along the path in both directions in order to monitor the health thereof. Therefore, either a bi-directional path or two unidirectional paths headed in reverse directions must be used. Alternatively, either IP forwarding or the signaling plane may be used for the reverse direction.

Figure 5:
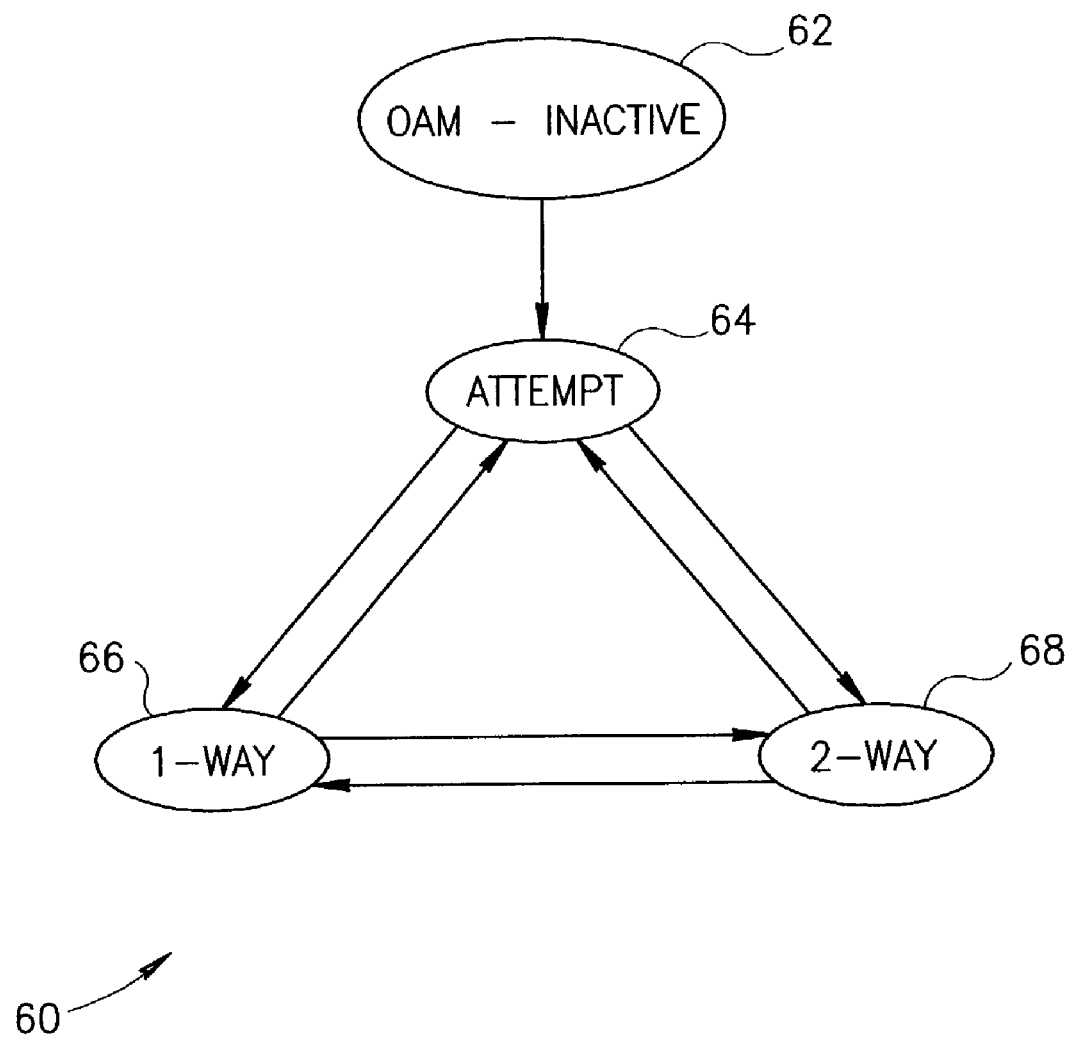
FIG. 5 is a diagram illustrating a state diagram used to implement the OAM protocol of the present invention.

The availability-monitoring protocol will be described in more detail. A diagram illustrating a state diagram used to implement the OAM protocol of the present invention is shown in FIG. 5. The OAM state transition diagram, generally referenced 60, comprises four states including OAM-Inactive 62, Attempt 64, 1-Way 66 and 2-Way 68.

At every OAM interval (configurable with default at one second), the node at which the tunnel starts sends an OAM packet along the path to its peer device at the other end of the tunnel. Every OAM packet comprises a flags field, which includes an acknowledge-bit. As long as a node does not receive OAM packets from the other side, it stays in the 'Attempt' state in which the node attempts to create the connection through that path with no success thus far. In addition, the node contains an inactivity timer for each path. The timer is reset each time an OAM packet is received on that path. When the timer approaches the value of InactivityFactor times OAMInterval, it causes the state machine to move to the 'Attempt' state, meaning that the path has failed. Note that the default value of InactivityFactor is 4.

The acknowledge bit is set to 0 if the OAM message currently received does not acknowledge any previously received OAM message. OAM messages with the acknowledge bit set to 0 are sent only when in the 'Attempt' state, i.e. after not receiving OAM messages from the other side in the last 'InactivityFactor' times 'OAMInterval' period. When in the 1-Way or 2-Way state, OAM packets are sent with the acknowledge bit set. Upon receiving an OAM message with the acknowledge bit cleared, the node changes the state of the path to '1-Way', meaning that it received OAM messages but its own OAM messages have not been acknowledged. In this state, the path is still considered failed.

Upon receiving an OAM message with the acknowledge bit set, the node changes the state of the path to '2-Way', meaning that it received OAM messages acknowledging the fact that its own OAM messages were received on the other side. The end-to-end protection scheme implemented in the nodes uses the OAM protocol in the following way: as long as the main path is not in the 'failed' state, it is used. When the main path fails, the protection path replaces it and the OAM protocol is executed on both paths.

It is important to point out that an advantage of the notification mechanism of the present invention is that it requires less bandwidth to be set aside for protection purposes. For example, consider a protection bandwidth policy designed to meet the following goals: (1) overall protection overhead should be equal to the end-to-end protection overhead (about double the original overhead), even when doing local protection and end-to-end protection in parallel; and (2) it is required to support wide connections/tunnels which are connections/tunnels having high bandwidth, i.e. up to the link capacity.

The above two goals are met by (1) not provisioning bandwidth for local protection and by (2) ensuring that local protection is performed for a very short time period after the failure. The goal is to use the local protection notification scheme of the present invention to ensure that the end-to-end protection takes over very quickly after local protection takes effect. Note that local protection will cause a reduction in the performance (i.e. not provide the CIR) of the connections/tunnels that are of low priority for the period of time in which local protection is active. This time period can be sub two seconds. In order to ensure that the protection scheme does provide sub 50 milliseconds for high priority traffic, the Call Admission Control (CAC) should preferably be configured to allow only a certain percentage of the link for high priority traffic. For example, permitting a maximum of 40% for high priority traffic results in 80% link usage in the event of a failure leaving 20% for low priority traffic. In this case, the high priority traffic displaces any low priority on the link up to 80%. Note also that the NMS should not permit the creation of connections/tunnels that have local protection but not end-to-end protection.

Figure 6:
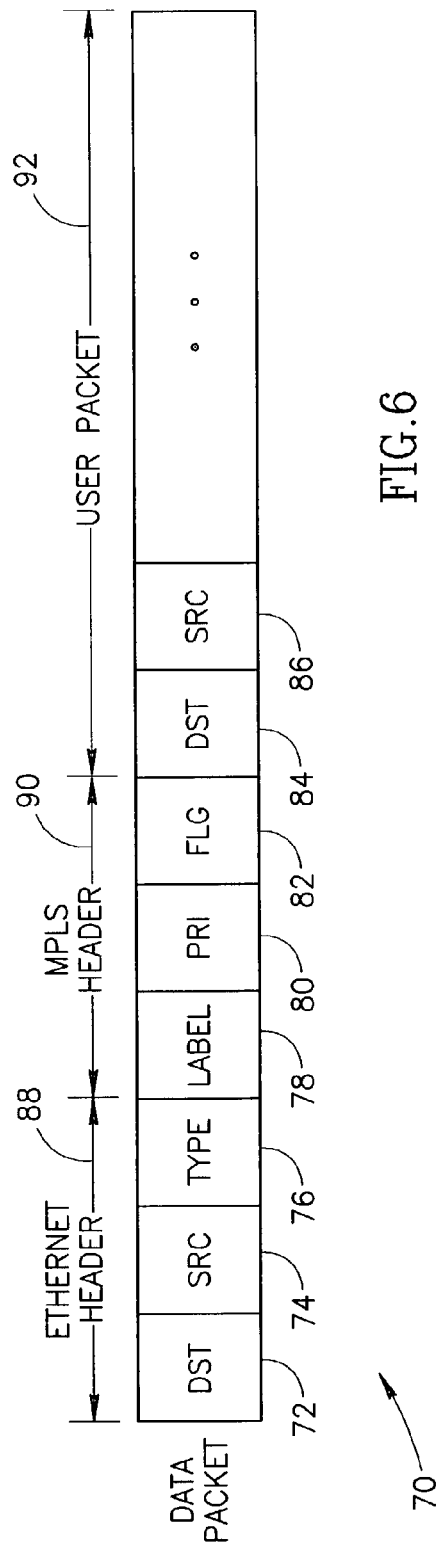
FIG. 6 is a diagram showing the structure of a user data packet.

A diagram showing the structure of a user data packet is shown in FIG. 6. The data packet, generally referenced 70, comprises an Ethernet packet with an MPLS and user packet encapsulated therein. The conventional Ethernet header 88 comprises destination field 72, source field 74 and type 76. The conventional MPLS header 90 comprises a label field 78, experimental bit field 80 which are used for priority information and a flag field 82, which is used to indicate that the bottom of the stack has been reached. The packet may include a number of such MPLS-headers and the bottom-of-stack field marks the last one. The user packet field comprises destination field 84, source field 86 and other user related fields.

Figure 7:
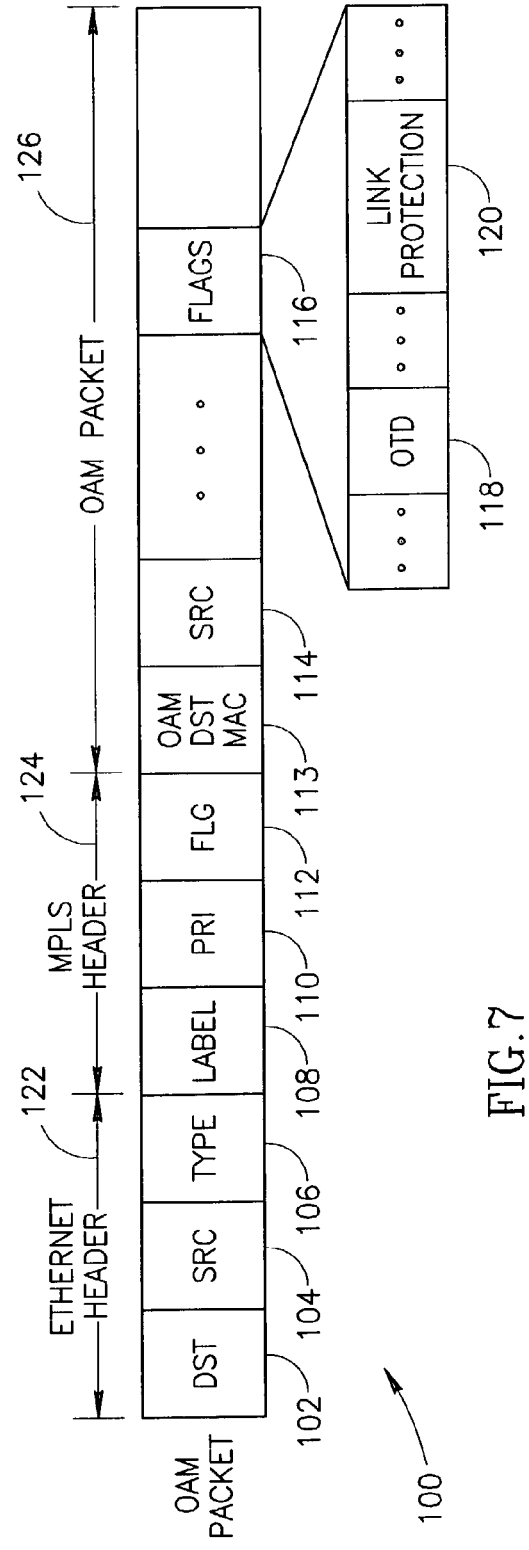
FIG. 7 is a diagram showing the structure of an OAM packet constructed in accordance with the present invention.

A diagram showing the structure of an OAM packet constructed in accordance with the present invention is shown in FIG. 7. The structure of the OAM packet, generally referenced 100, is very close to that of the user data packet 70 (FIG. 6). The difference being that the user packet portion is replaced with an OAM packet. This permits the OAM packets to travel along the path as data packets without the requirement of having special handling for transporting them. Thus, similar to the data packet, the OAM packet comprises a conventional Ethernet header 122 comprising destination field 102, source field 104 and type 106; one or more conventional MPLS headers 124 comprising label field 108, priority field 110 and a flag field 112. The OAM packet field 126 comprises a destination field 113, source field 114, a flags field 116 and other OAM related fields. The flags field comprises an Other Tunnel Down (OTD) flag bit 118 and a link protection flag bit 120. Alternatively, the OAM packet may include the OAM related fields directly after the MPLS header, without the extra destination and source fields.

The network processor or hardware portion of the port in each node that performs the local protection switching needs to identify OAM messages that are to be sent over the protection tunnel. The OAM packets may be identified using any suitable means or mechanism. In one embodiment, the OAM packets are identified according to the destination MAC address in the encapsulated OAM message. The network processor identifies this special MAC address and sets the local protection bit in the flags field of the OAM packet header. Alternatively, an additional MPLS-label having a well-known value can be used for the purpose of identifying the OAM packet, wherein in this case the packets are identified according to the value of this additional label.

The destination MAC address used is a well known address unique to a manufacturer. One reason to use a special MAC address is for security where it is desired to block the user nodes from injecting OAM packets into the network. If an OAM packet is received by an edge node from a customer node, it is rejected. A second reason to use a special MAC address is that it provides an effective, simple mechanism to identify OAM packets.

The interaction of the OAM protocol with local protection will now be described in more detail. As described above, the invention is operative to notify the end nodes of the path that MPLS protection tunnel based local protection has been activated in the network. It is desirable that this fact be conveyed to the end nodes of the connection/tunnel as soon as possible, preferably within one second for several reasons.

First, it is desirable that the end-to-end protection mechanism switch to the backup path in the event local protection is activated, since local protection is sub optimal. Without the notification mechanism of the present invention, the end nodes would not be informed and would not know to switch paths since local protection is transparent to the end nodes. Local protection is sub optimal because it increases traffic delays, increases the path length and depending on the implementation degrades the CIR of low priority traffic.

The invention can be used to inform the network operator that a specific connection is going through a protection tunnel in response to activation of local protection. Other uses for the OAM messages include surveillance applications including monitoring the status of connections/tunnels even if not protected by an end-to-end protection mechanism. It is desirable that the notification mechanism inform the operator that the connection/tunnel goes through a protection-tunnel due to local-protection activation.

Figure 8:
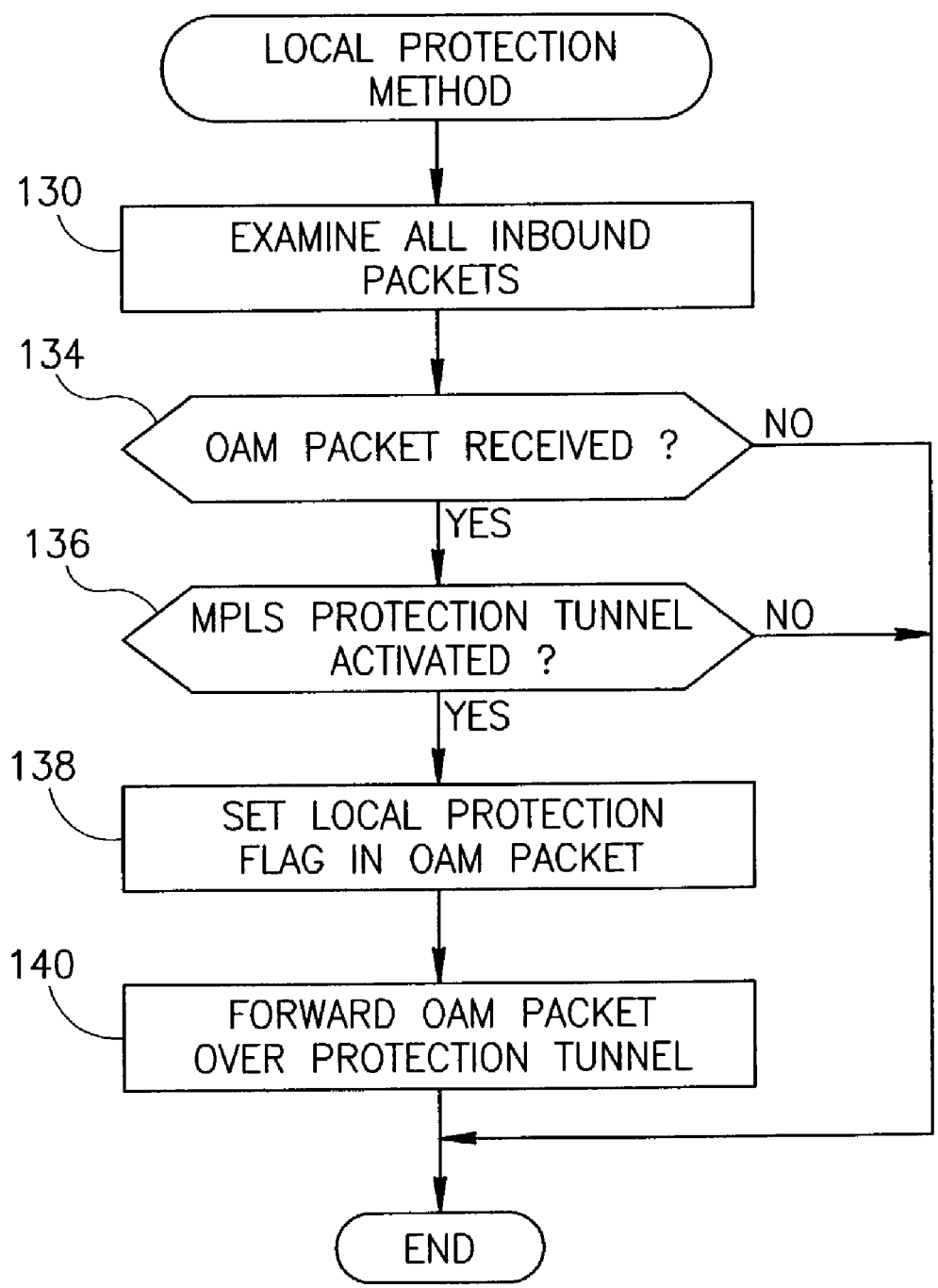
FIG. 8 is a flow diagram illustrating the local protection method of the present invention implemented in intermediate nodes in the network.

To achieve this, a local protection (also referred to as link protection) flag bit is added to the flags field of the OAM packet. The method of local protection of the present invention, as shown in FIG. 8, is implemented on intermediate nodes in the network and utilizes the link protection bit. When performing local protection, the network processor associated with the failed link functions to not only reroute packets to the protection tunnel but also functions to identify and alter the OAM messages. The network processor associated with the failed link examines the packets received from each link (step 130). If an OAM packet is received (step 134), it is checked if the packet is to be sent over a protection tunnel (step 136). In each OAM message to be rerouted to the protection tunnel, the network processor sets the local protection bit (step 138). The OAM messages are then forwarded over the protection tunnel (step 140). When the OAM messages reach their destination at the end node of the connection/tunnel, the end node will be aware of the fact that the path currently used for the connection/tunnel goes through a local protection tunnel.

Note that the API or other software interface between the OAM protocol software and the upper layer software (i.e. end-to-end protection software or surveillance software) preferably is adapted to inform the upper layer software when an OAM message with the local protection bit set is received, as well as when messages without the bit set begin to be received again.

As described supra, core local protection is sub optimal in that (1) it does not provide the optimal path for protected data; and (2) it does not provide the CIR for low-priority connections/tunnels that go through the protection tunnel and for low priority connections/tunnels that happen to use the links that the local protection tunnel flows through. Note that this is the case for a specific implementation in which no bandwidth is allocated for local-protection tunnels. For this reason, it is preferable that the period that the local protection is active be as short as possible and have the end-to-end protection takeover (i.e. switch to the alternative path) as quickly as possible.

Figure 9:
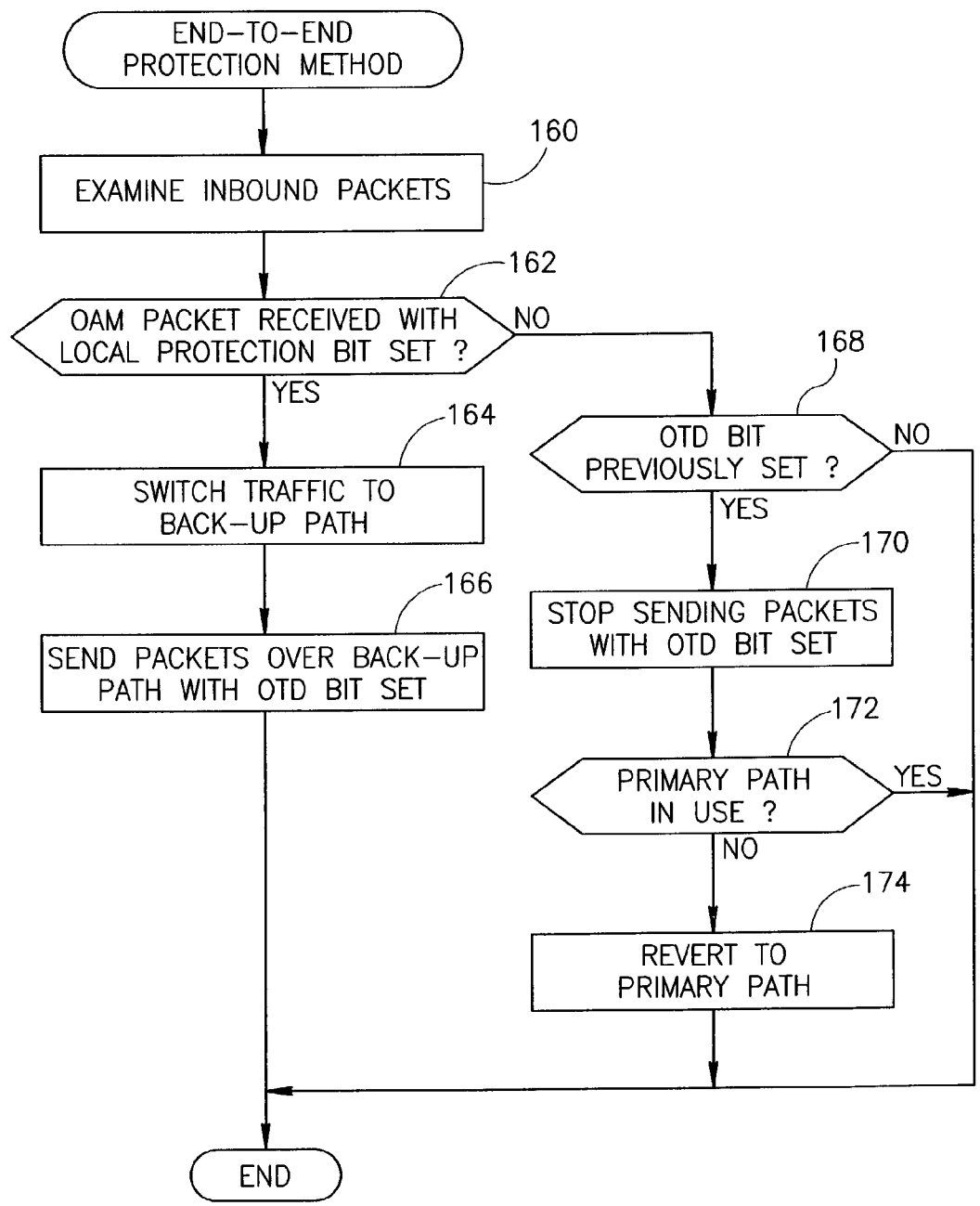
FIG. 9 is a flow diagram illustrating the end-to-end protection method of the present invention.
Figure 10:
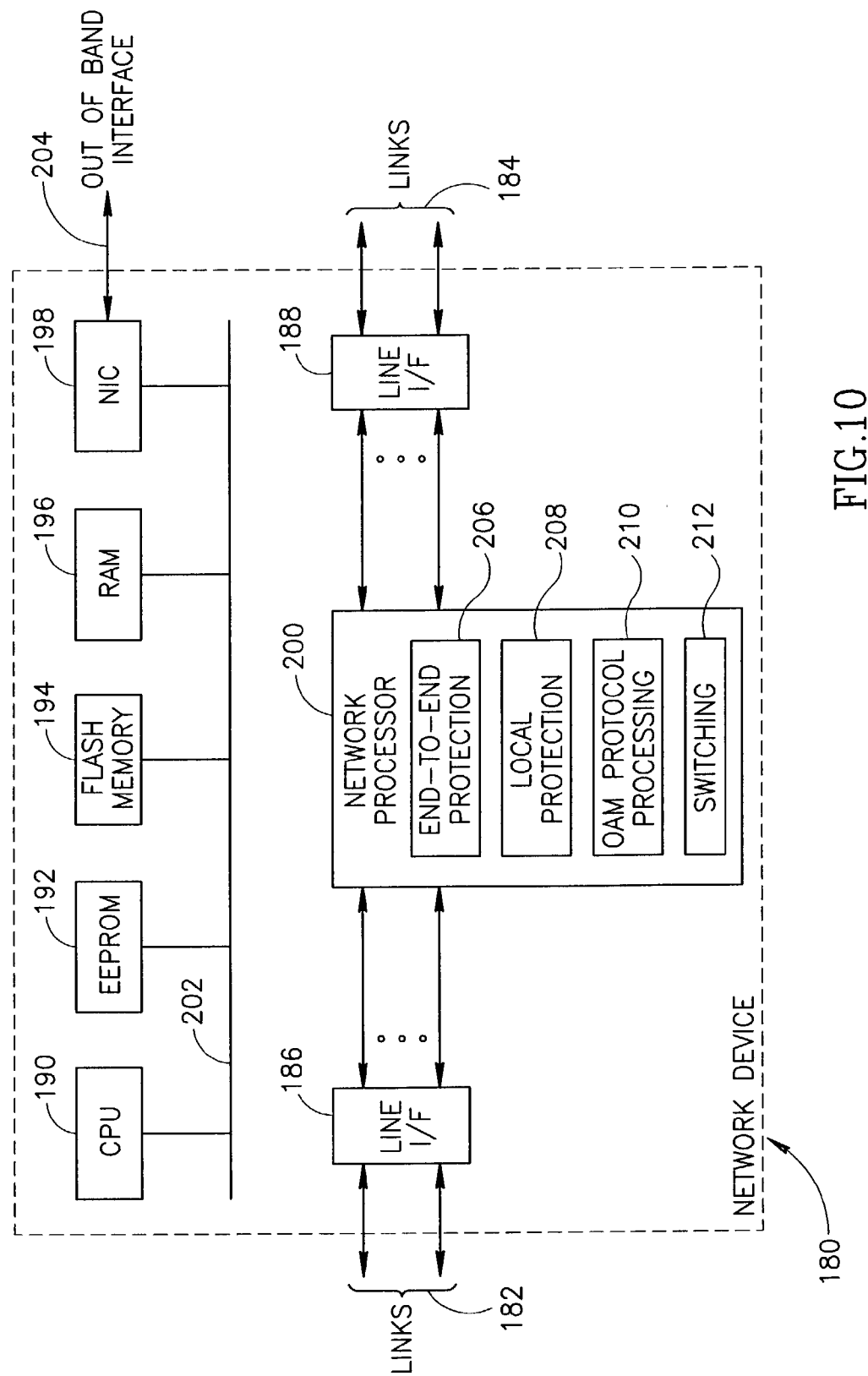
FIG. 10 is a block diagram illustrating an example network device incorporating the local protection notification mechanism of the present invention.

The OAM protocol of the present invention aids in achieving this goal. A flow diagram illustrating the end-to-end protection method of the present invention is shown in FIG. 9. The end-to-end protection method is implemented on the nodes at either end of a path. The network processor for the port associated with a link examines all inbound packets (step 160) for OAM packets (step 162). Upstream, the OAM packets that flow through a local protection tunnel were marked by the network processor switching packets to the tunnel via the local protection bit. The OAM packets are identified by the special well known destination MAC address. In response to receiving an OAM message with this bit set, the end node activates the end-to-end protection mechanism for that particular connection/tunnel only and switches to the backup path associated with the connection/tunnel (step 164). The end-to-end protection mechanism then tells the OAM protocol to start sending the packets on the backup path with the Other Tunnel Down (OTD) bit set (step 166). This bit being set causes the other side of the connection/tunnel to switch paths as well.

The OAM protocol software layer informs the end-to-end protection mechanism when packets received from the primary path cease having the local protection bit set (step 168). At this point, the end-to-end protection informs the OAM protocol to stop sending the OTD bit on the backup path and respond for this connection/tunnel only in the same way it responds after a first hop link recovery (step 170). In other words, if it is already transmitting on a primary path, continue without changes (step 172). If it is transmitting on a protection path and stopped receiving packets from the main path OAM packets with the local protection bit set, a reversion timer is started in order to return to the primary path when the timer times out (step 174).

When receiving packets with the local protection bit set on the backup path during the reversion timeout, the software immediately moves to the main path and starts sending OAM packets over the main path with the OTD bit set. The end-to-end protection software also immediately stops sending OAM packets on the backup path. The OTD bit is preferably reset a time interval after it is sent. If not, the opposite end node at the other side may not receive it. This can be achieved in one of three ways: (1) stopping the OTD only after the OAM state machine times out on receiving OAM messages from the other side on the backup path; (2) to use a timer of 4 seconds; and (3) to send the OTD bit on 4 OAM packets.

When both the main path and backup path pass through a protected link (i.e. OAM packets with the local protection bit set are received from both paths), the backup path should be used because in this state both paths are monitored with OAM messages. This scenario may occur due to a single failure in the case of a WDM environment. Observe that in this case, we are left with the non-optimal behavior in terms of bandwidth and delay of the local protection mechanism.

Another special case is when both the main and the backup paths are asymmetric (i.e. do not use the same path in both directions) and the environment is a WDM environment. In this case, a single failure can cause one of the end-points to receive packets with the OTD bit set and with the local protection bit set from the main path while the other end point receives packets with the OTD bit set and with the local protection bit set from the backup path. The rule is to use the protection path in this case as well because this provides (1) fast reaction time for the case of a first failure (i.e. failure of the primary path), (2) convergence in 10-seconds for the case of secondary path failure (but this is a two failures case), and (3) the ability to stabilize on one side using the primary and one side using the backup in the case of two local protection failures.

Network Device Embodiment

A network device can be adapted to implement the local protection notification mechanism of the present invention. Hardware means and/or software means adapted to execute the mechanism may be incorporated within a network device such as a Network Management System, Label Switching Router (LSR), network switch or any other wired or wireless network device. The device may be constructed using any combination of hardware and/or software.

A block diagram illustrating an example network device such as a switch router incorporating the local protection notification mechanism of the present invention is shown in FIG. 11. The network device, generally referenced 180, comprises a processor 190 which may be implemented as a microcontroller, microprocessor, microcomputer, ASIC core, FPGA core, central processing unit (CPU) or digital signal processor (DSP) or any other suitable computing means. The system further comprises non volatile memory including EEPROM 192 for storing configuration and network related parameters, Flash memory 194 for storing program code and configuration parameters and dynamic main memory (e.g., RAM) 196 all in communication with the processor. The processor is also in communication, via a bus 202, with a number of peripheral devices that are also included in the computer system. A single modular LSR may be built of a number of modules (e.g., cards), each containing part of the switching fabric and a number of line interfaces. Each such module may contain a CPU subsystem of its own, including CPU and volatile as well as nonvolatile memory.

The network device comprises a NIC 198 for providing an out of band interface 204 for connecting to external entities such as a craft for local maintenance and configuration purposes, a NMS for centralized administration and control or a Local Area Network (LAN). The device may comprise additional interfaces, such as a serial interface for connecting to a PC for configuration purposes.

The network device also comprises a network processor 200 for providing major functionality of the device. In particular, the network processor comprises, in accordance with the present invention, means for performing end-to-end protection 206, means for performing local or link protection 208, means for performing availability (or OAM) protocol processing 210 (part of which can also be processed by the CPU 190) and a switching core 212 adapted to perform the switching function of the network device. The switching core may comprise, for example, hardware for performing MPLS, Frame Relay or ATM switching. Note that the network processor may be implemented in any suitable manner such as a microcontroller, microprocessor, microcomputer, ASIC core, FPGA core, central processing unit (CPU) or digital signal processor (DSP) or any other computing means.

One or more line interface cards 186, 188 provide the PHY interface to two way communication links 182, 184. As an example, the interface cards may be adapted to interface to any combination of the following communication links: any variety of copper or optical based Ethernet, Token Ring, FDDI, SONET/SDH, ATM.

The network device also comprises an optional user interface adapted to respond to user inputs and provide feedback and other status information. A host interface enables communication with a host computing device. The host may be adapted to configure, control and maintain the operation of the device. The device may also comprise magnetic storage device means for storing application programs and data.

The network device comprises computer readable storage medium which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the local protection notification mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform the local protection notification mechanism of the present invention or any portion thereof may also reside, in whole or in part, in the static or dynamic main memories or in firmware within the processor of the network device (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of end-to-end notification of local protection in a network for use on an intermediate node along a path in said network, said method comprising the steps of:
   receiving end-to-end protocol packets sent from a first edge node to a second edge-node;
   identifying received end-to-end protocol packets to be forwarded to a local protection tunnel due to a failure in said network; and
   setting a link protection indication in end-to-end protocol packets to be sent over said local protection tunnel, said link protection indication adapted to notify an end node of said path that local protection has been activated in said network.

2. The method according to claim 1, wherein said end-to-end protocol comprises an Operation, Administration and Maintenance (OAM) protocol.

3. The method according to claim 1, wherein said end-to-end protocol packets comprise Ethernet packets.

4. The method according to claim 1, wherein said end-to-end protocol packets comprise Multiprotocol Label Switching (MPLS) packets.

5. The method according to claim 1, wherein said link-protection indication comprises a single-bit flag.

6. The method according to claim 1, wherein said local protection tunnel comprises Multi-Protocol Label Switching (MPLS) protection tunnel.

7. The method according to claim 1, further comprising the step of limiting the bandwidth provisioned for high priority traffic to less than half the total link bandwidth.

8. The method according to claim 1, wherein no bandwidth is provisioned for local protection in said network.

9. The method according to claim 1, further comprising the step of redirecting traffic from said path which is protected by a local protection tunnel to a backup path within 2 seconds of said failure.

10. The method according to claim 1, further comprising the step of ceasing to set said link protection indication in said end-to-end protocol packets when redirection to a local protection tunnel ceases.

11. The method according to claim 1, wherein said step of identifying comprises recognizing an Operation, Administration and Maintenance (OAM) destination MAC address in said end-to-end protocol packet.

12. The method according to claim 1, wherein said step of identifying comprises recognizing an Operation, Administration and Maintenance (OAM) Multiprotocol Label Switching (MPLS) label in said end-to-end protocol packet.

13. A method of monitoring the availability of a path in a network, said method comprising the steps of:

generating and sending operation, administration and maintenance (OAM) packets end-to-end on a path in said network;

receiving OAM packets on an intermediate node; and identifying received OAM packets directed to a protection path and setting a link protection flag in said identified OAM packets in response thereto, said link protection flag adapted to notify an end node of said path that local protection has been activated in said network.

14. The method according to claim 13, wherein said OAM packets comprise Ethernet packets.

15. The method according to claim 13, wherein said OAM packets comprise Multiprotocol Label Switching (MPLS) packets.

16. The method according to claim 13, wherein said protection tunnel comprises Multi-Protocol Label Switching (MPLS) protection tunnel.

17. The method according to claim 13, further comprising the step of limiting the bandwidth provisioned for high priority traffic to less than half the total link bandwidth.

18. The method according to claim 13, wherein no bandwidth is provisioned for local protection in said network.

19. The method according to claim 13, further comprising the step of ceasing to set said link protection flag in said OAM packets when redirection to a local protection tunnel ceases.

20. The method according to claim 13, wherein said step of identifying comprises recognizing an OAM destination MAC address in said OAM packet.

21. The method according to claim 13, wherein said step of identifying comprises recognizing an Operation, Administration and Maintenance (OAM) Multiprotocol Label Switching (MPLS) label said OAM packet.

22. A method of end-to-end notification of local protection in a network for use in a first edge node in communication with a second edge node along a path in said network, said method comprising the steps of:

receiving operation, administration and maintenance (OAM) packets comprising a link protection bit set by an intermediate node in the event said OAM packet is directed through a local protection tunnel due to a failure in said network;

identifying received OAM packets having said link protection bit set indicating that said path has been routed through a local protection tunnel; and redirecting traffic destined to said second edge node over a backup path in response to said link protection bit being set.

23. The method according to claim 22, wherein said OAM packets comprise Ethernet packets.

24. The method according to claim 22, wherein said local protection tunnel comprises Multi-Protocol Label Switching (MPLS) protection tunnel.

25. The method according to claim 22, further comprising the step of limiting the bandwidth provisioned for high priority traffic to less than half the total link bandwidth.

26. The method according to claim 22, wherein no bandwidth is provisioned for local protection in said network.

27. The method according to claim 22, wherein said link protection bit ceases to be set in said OAM packets when redirection to a local protection tunnel stops.

28. The method according to claim 22, wherein said step of identifying comprises recognizing an OAM destination MAC address in said OAM packet.

29. A network processor for use in an intermediate network node located along a path in a network, comprising:

means for receiving end-to-end protocol packets sent from an edge node;

means for identifying received end-to-end protocol packets destined to a local protection tunnel due to a failure in said network; and means for setting a link protection flag in end-to-end protocol packets to be sent over said local protection tunnel, said link protection flag adapted to notify an end node of said path that local protection has been activated in said network.

30. The network processor according to claim 29, wherein said end-to-end protocol packets comprise operation, administration and maintenance (OAM) packets.

31. The network processor according to claim 29, wherein said OAM packets comprise availability-monitoring protocol packets.

32. The network processor according to claim 29, wherein said means for identifying is adapted to recognize an Operation, Administration and Maintenance (OAM) destination MAC address in said OAM packet.

33. The network processor according to claim 29, adapted to be implemented in an Application Specific Integrated Circuit (ASIC).

34. The network processor according to claim 29, adapted to be implemented in a Field Programmable Gate Array (FPGA).

35. A network device for use in an intermediate network node located along a path in a network, comprising:

one or more line PHY line interfaces for interfacing said network device to one or more communication links;

a switch adapted to switch data between a plurality of ingress inputs and a plurality of egress outputs;

processing means operative to:

receive operation, administration and maintenance (OAM) packets sent from an edge node;

identify received OAM packets destined to a local protection tunnel due to a failure in said network; and set a link protection indication in OAM packets to be sent over said local protection tunnel, said link protection indication adapted to notify an end node of said path that local protection has been activated in said network.

36. The network device according to claim 35, wherein said processing means is operative to identify received OAM packets by recognizing an OAM destination MAC address in said OAM packet.

37. The network device according to claim 35, adapted to be implemented in an Application Specific Integrated Circuit (ASIC).

38. The network device according to claim 35, adapted to be implemented in a Field Programmable Gate Array (FPGA).

39. A network device for use in a first edge node in communication with a second edge node along a path in said network, comprising:

one or more PHY line interfaces for interfacing said network device to one or more communication links;

a switch adapted to switch data between a plurality of ingress inputs and a plurality of egress outputs;

processing means operative to:

receive operation, administration and maintenance (OAM) packets comprising a link protection indication set by an intermediate node in the event said OAM packet is directed through a local protection tunnel due to a failure in said network;

identify received OAM packets having said link protection indication set indicating that said path has been routed through a local protection tunnel; and redirect traffic destined to said second edge node over a backup path in response to said link protection indication being set.

40. The network device according to claim 39, wherein said processing means is operative to identify received OAM packets by recognizing an OAM destination MAC address in said OAM packet.

41. The network device according to claim 39, adapted to be implemented in an Application Specific Integrated Circuit (ASIC).

42. The network device according to claim 39, adapted to be implemented in a Field Programmable Gate Array (FPGA).

43. A computer program product for use in a network device, said computer program product comprising:

a computer useable medium having computer readable program code means embodied in said medium for performing a path reroute in a network, said computer program product comprising:

computer readable program code means for receiving operation, administration and maintenance (OAM) packets sent from an edge node;

computer readable program code means for identifying received OAM packets destned to a local protection tunnel due to a failure in said network; and computer readable program code means for setting a link protection flag in OAM packets to be sent over said local protection tunnel, said link protection flag adapted to notify an end node of said path that local protection has been activated in said network.

* * * * *